United States Patent [19]
Graff et al.

[11] Patent Number: 5,879,728
[45] Date of Patent: Mar. 9, 1999

[54] CHEWABLE CONFECTIONARY COMPOSITION AND METHOD OF PREPARING SAME

[75] Inventors: Allan H. Graff, Randolph, N.J.; James E. Bagan, deceased, late of Yonkers; Maureen Vachna, legal representative, North White Plains, both of N.Y.

[73] Assignee: Warner-Lambert Company, Morris Plains, N.J.

[21] Appl. No.: 767,396

[22] Filed: Dec. 16, 1996

Related U.S. Application Data

[60] Provisional application No. 60/010,782 Jan. 29, 1996.

[51] Int. Cl.$^6$ .................................................. A23G 3/30
[52] U.S. Cl. ............................... 426/5; 426/103; 426/660
[58] Field of Search ........................ 426/3, 5, 6, 564, 426/571, 660, 103

[56] References Cited

U.S. PATENT DOCUMENTS

| | | | |
|---|---|---|---|
| 3,912,817 | 10/1975 | Sapsowitz | 426/5 |
| 4,224,345 | 9/1980 | Tezuka et al. | 426/3 |
| 4,271,199 | 6/1981 | Cherukuri et al. | 426/5 |
| 4,352,823 | 10/1982 | Cherukuri et al. | 426/5 |
| 4,352,825 | 10/1982 | Cherukuri et al. | 426/5 |
| 4,601,907 | 7/1986 | Knebl et al. | 426/5 |
| 4,741,905 | 5/1988 | Huzinec | 426/3 |
| 4,847,090 | 7/1989 | Della Posta et al. | 424/440 |
| 4,911,937 | 3/1990 | Crosello et al. | 426/660 X |
| 4,971,806 | 11/1990 | Cherukuri et al. | 426/5 |
| 5,045,326 | 9/1991 | Glass et al. | 426/5 |
| 5,437,879 | 8/1995 | Kabse et al. | 426/5 |

FOREIGN PATENT DOCUMENTS

| | | | |
|---|---|---|---|
| 58-018052 | 4/1983 | Japan . | |
| 62-87048 | 4/1987 | Japan | 426/3 |
| 63-105642 | 5/1988 | Japan | 426/3 |
| WO9422323 | 10/1994 | WIPO . | |

OTHER PUBLICATIONS

B. W. Minifie, "Chocolate, Cocoa and Confectionery: Science and Technology", 2nd Edition, AVI Publishing Co. Inc. Westport, CT. (1980) pp. 424–425.

*Primary Examiner*—Arthur L. Corbin
*Attorney, Agent, or Firm*—Linda A. Vag

[57] ABSTRACT

The present invention provides a chewable confectionery product having a core and an outer shell wherein said core and said outer shell have different chew textures and (a) said core comprises a chewing gum composition comprising a chewing gum base, sweetener, softener and flavorant; and, (b) said outer shell comprises a nougat-like confectionery composition comprising a sweetener, whipping agent and a fat content of 0 to 7 percent by weight of said composition. The present invention also provides methods for preparing said chewable confectionery product.

13 Claims, No Drawings

CHEWABLE CONFECTIONARY COMPOSITION AND METHOD OF PREPARING SAME

This application claims priority to provisional application Ser. No. 60/010,782, filed Jan. 29, 1996.

BACKGROUND OF THE INVENTION

1. Field of the Invention

The present invention relates to a chewable confectionery composition and in particular to a chewing gum-confection composition having a pliable confectionery shell and a chewing gum core.

2. Description of the Prior Art

Confectionery products are sweet goods which are favored by virtually everyone. To remain competitive in this industry, those skilled in the confectionery arts are faced with the challenge of creating innovative products with unique variations in flavor characteristics, chewing texture and mouthfeel.

Chewing gums are confectionery goods which generally provide flavor, texture and the pleasure brought about by chewing. Chewing gums are usually comprised of a gum base, sweeteners and flavorants. The gum base is usually comprised of elastomers, elastomer solvents and additional components used to soften or plasticize the base such as fats and/or oils. Excessive amounts of fat and/or oil can however, cause the gum base to become gelatinous-like with an accompanying loss of structural integrity and breakdown upon chewing. In the case of bubblegum an excess of fat can also affect the bubble.

A popular form of candy having a pliable consistency is nougat. Nougats are perhaps the most complex of the generic confectionery bases, having no one single recipe but a variety of suggestions. Nougat is basically an aerated, high-boiled syrup containing fat that has been stabilized by the addition of whipping agent. The texture of nougat can range from long, chewy to short, grained depending on the crystal structure. Fats are traditionally used in pliable confections such as nougats to influence the texture and eating characteristics and essentially to lubricate the structure of the nougat, modify any stickiness and aid in the processing of the confection, e.g., cutting and manufacturing. Fat may also act as the flavor carrier. Because of their traditionally high fat content, nougats are not readily combined with chewing gum in confectionery compositions without the fat in the nougat adversely affecting the gum base upon chewing.

U.S. Pat. No. 3,912,817 to Sapsowitz discloses a chewing gum having a smooth, fine-grained flaccid skin and a nougat-like interior. The gum is prepared from conventional chewing gum base, added sugar and conventional additives using precise processing parameters.

U.S. Pat. No. 4,224,345 to Tezuka et al. discloses a chewing gum base to be used in combination with confectionery materials having a high fat content, especially chocolates.

U.S. Pat. No. 4,271,199 to Cherukuri et al. discloses a sweetener containing chewing gum having a nougat-like or fondant-like structure.

U.S. Pat. No. 4,352,823 and U.S. Pat. No. 4,352,825 to Cherukuri et al. disclose coextruded chewing gums containing a substantially soft core portion and an outer shell portion provided to protect the inner portion.

U.S. Pat. No. 4,601,907 to Knebl et al. discloses a chewy confection having an outer casing comprising chewing gum base and a sweetener, and a center filling that is an aerated plastic blend. The center filling is described as having a consistency similar to that of the casing so that at first bite through the confection the center filling is not readily distinguished.

U.S. Pat. No. 4,741,905 to Huzinec discloses a single phase chewing gum candy formed by mixing a melted chewing gum base with a cooked hard candy sorbitol syrup.

U.S. Pat. No. 4,847,090 to Della Posta et al. discloses a compressed confectionery product and in particular, a method for making the product. The product is comprised of two or more compressed layers which can be used to provide different physical or chemical characteristics.

U.S. Pat. No. 4,971,806 to Cherukuri et al. teach an anhydrous layered chewing gum composition comprising at least two different chewing gum compositions non-homogeneously combined, that differ in gum base content and may contain the same or different flavoring agents and sweeteners.

U.S. Pat. No. 5,437,879 to Kabse et al. discloses a multi-layer chewing gum having layers of chewing gum sandwiched about a hydrophillic gel-creme confection layer.

JP 83018052 assigned to Kuraray discloses a chewing gum intermixed with nougat. The product also requires, inter alia, the presence of fibrous milk proteins.

PCT/US94/03238 assigned to Wrigley discloses novel chewing gum products which are multiphase, sheeted chewing gum products wherein a second confectionery mass is embedded in a first chewing gum mass.

Despite the forgoing efforts, none of the prior art provides a chewable confectionery product which combines a pliable confection such as a short, grained nougat as an outer shell with a chewing gum inner core. It would be desirable to provide a chewable confectionery composition which combines the confectionery texture provided by a short, grained nougat-type confection with the long chew provided by a chewing gum without any loss of structural integrity, texture, mouthfeel, flavor and organoleptic properties of the two components.

SUMMARY OF THE INVENTION

The present invention provides a chewable confectionery product having a core and an outer shell wherein said core and said outer shell have different chew textures and a) said core comprises a chewing gum composition comprising a chewing gum base, sweetener, softener and flavorant; and, b) said outer shell comprises a pliable confectionery composition comprising a sweetener, whipping agent and a fat content of 0 to 7 percent by weight of said composition.

The present invention also provides methods for preparing said chewable confectionery product.

DETAILED DESCRIPTION OF THE INVENTION

The present invention provides a chewable confectionery composition having a pliable outer shell component and a chewing gum core component. The pliable outer shell component is a grained, aerated nougat-type confection. In particular the present invention provides a grained, nougat-type confection having a high sugar content with reduced or no fat content.

More specifically this invention relates to a high sugar, low fat or fat free, grained, pliable confection used as an outer shell in a concentrically formed confectionery composition having a chewing gum core. The present invention concerns the preparation of the pliable confection, the chewing gum component and the manufacture of the chewable confectionery product.

An object of the invention is to provide as a shell material a pliable confection which grains or crystallizes quickly resulting in a product which does not cold flow, i.e., have a tendency to flow slowly on storage, taking on the shape of the container or packaging in which it is held. Pliable confections such as nougats traditionally contain a 1/1 or greater corn syrup to sucrose ratio in a grained nougat, and usually about 3/2 by weight. In the present invention it is preferred to have a corn syrup to sucrose ratio in which the amount of sucrose exceeds the amount of corn syrup. Preferred is a sucrose/corn ratio of from about 3/2 to about 4/1. The pliable confectionery component will thus have a more crystalline feel and not cold flow. It will also have less flow under hot conditions such as those encountered during processing. A nougat with a high sucrose content also sets quickly.

Another object of the invention is to provide as a shell material a pliable confection with a reduced fat content or one that eliminates the presence of fat. A nougat-like confection with low fat will not adversely affect the chewing gum core. While a fat free confection is a preferred embodiment, an amount of fat may be desirable to achieve better processing of the product. A fat content of 7% or less by weight is suitable. A fat content of less than 5.5% is preferred.

Another object of this invention is to provide a confectionery composition having unique flavor, texture and chew characteristics. The composition of the invention provides a change in texture upon chewing through the combination of two textures. The composition provides an initial short chew of a grained, nougat-like confection. The initial nougat-like chew is unlike that of a standard chewing gum or bubblegum. After mastication the chew converts to the softer chew of a conventional chewing gum or bubblegum.

An aspect of the invention is that different flavors may be used in the outer pliable shell and the inner chewing gum core providing a flavor change upon chewing. For example, one could provide a vanilla flavor in the pliable shell and an orange flavor in the chewing gum inner core. It is an object of the invention therefore to provide a confectionery composition having a change in flavor upon chewing. One could of course use the same flavor in both components, thus providing a continuous flavor perception throughout the chew.

Another aspect of the invention is the long lasting perception of flavor provided by the composition. Throughout the change in texture during chewing, from the initial perception of the chewy pliable nougat-like component, to a chewing gum mouthfeel, a sustained flavor is provided. It is an object of the invention therefore to provide a confectionery composition having a sustained flavor effect.

The product of the invention comprises an outer, pliable confectionery shell and an inner, chewing gum core wherein the pliable outer shell may be from about 30 to about 70 percent by weight of the confection product. The amount to be used can readily be determined by one skilled in the art depending, inter alia, on the desired balance of providing a suitable nougat-like initial chew without at the same time using an amount of nougat in the composition wherein the low-fat content of the nougat could adversely affect the chewing gum base. To achieve this object it is preferred to have the pliable confection present in an amount of from about 45 to 55 percent of the total chewable confectionery composition.

The chewing gum core may be any suitable known chewing gum. It may be a standard gum or a bubblegum. It is preferred to use a bubblegum as the gum component in the practice of the present invention.

The chewing gum may have a base content of from 5% up to 75% by weight of the chewing gum. It is preferred to use a gum having a higher amount of gum base. A higher amount of gum base provides an amount of bolus suitable to provide an adequate chewing gum sensation, subsequent to the chewing out of the soluble or extractable components of the confection. In the practice of the present invention it is preferred to use base in amounts of from 25%–65%, and most preferably 35–55% by weight of the chewing gum. The use of a higher amount of gum base in the gum core is particularly advantageous for those embodiments having fat in the pliable confection.

The confection of the present invention can be made by any process which can be used to concentrically form the chewable confection having a chewing gum core and nougat outer shell. Such processes may be batch roller-type processes or coextrusion processes. A coextrusion process is preferred. It is also preferred to form the confection as a rope wherein the outer pliable confection surrounds an inner chewing gum center during extrusion. The rope may then be cut to provide a piece of the desired size said piece showing the profile of the shell surrounding the gum center. The rope may likewise be pinched to provide a pillow-like product.

Pliable confections such as nougats are aerated high boiled syrups containing fat that have been stabilized by the addition of a whipping agent. The production of nougat can be adjusted to give a range of textures that can vary between a long-eating, chewy, non-grained product and a short-eating, soft, fine-grained product. The texture of nougat is influenced by: (1) the ratio of sugar to glucose syrup to invert sugar syrup; (2) the final moisture content of the nougat base; (3) the ratio of the liquid to the solid phase; (4) the type of whipping agent used; (5) the degree of aeration; and, (6) the quantity and type of additions. A general discussion of the composition and preparation of nougat confections may be found in B. W. Minifie, CHOCOLATE, COCOA AND CONFECTIONERY: Science and Technology, 2nd Edition, AVI Publishing Co., Inc., Westport, Conn. (1980) at Pages 424–425.

The whipping agent is usually treated separately from the syrup components to first form a frappe which is then combined with the boiled syrup. The whipping agent is selected from materials such as gelatin, agar agar, egg albumen, gum arabic, dextrin, pectins, milk proteins such as casein, and vegetable proteins such as soy protein and the like. Certain of these materials, notably gelatin, agar agar and pectin, are gelling agents. The type of whipping agent selected and the degree of aeration of the frappe can affect the texture of the nougat. These agents are generally used in combination with a sweetener solution usually a corn syrup to form the frappe. The whipping agent is present in amounts of about 1 to about 15% by weight of the frappe, to which is added the sweetener solution in amounts of about 70 to about 96% by weight of the frappe. The frappe is generally prepared in a mixer such as a planetary mixer having a whisk blade using high speed. The boiled syrup may then be added at lower speeds. The density of the frappe will be from about 0.3 to 1.0 g/ml.

Corn syrup is most often selected for use as the sweetener in the frappe but other sweeteners may be used in whole or in part in place of corn syrup. Those sweeteners may be selected from water-soluble sweetening agents such as monosaccharides, disaccharides and ploysaccharides such as xylose, ribose, glucose (dextrose), mannose, galactose, fructose (levulose), sucrose (sugar), maltose, invert sugar (a mixture of fructose and glucose derived from sucrose), dextrins, maltodextrins, hydrogenated starch hydrolysates, hydrogenated hexoses, dihydrochalcones, monellin, steviosides, glycrrhizin, sugar alcohols such as sorbitol, xylitiol, mannitol, maltitol and the like and mixtures thereof.

By comparison with the frappe component, the high boiled syrup, or bob syrup, is relatively viscous and possesses a higher density, and frequently contains a substantial amount of the sugar components. The bob syrup usually comprises sucrose in amounts of about 50 to about 80% by weight of the bob syrup; corn syrup, in amounts of about 15 to about 40% by weight of the bob syrup; and a residual moisture content of about 5 to about 10% by weight of the bob syrup. In the practice of the present invention a high ratio of sucrose to corn syrup is preferred for the bob syrup. The syrup is usually heated in a candy cooker such as a vacuum cooker, to temperatures above 120° C. to remove water and to form a molten candy.

The bob syrup and the frappe are combined in a mixer such as a planetary mixer, to produce the basic nougat-like composition. The composition generally is comprised of frappe in an amount of about 1.0 to about 30% and bob syrup in an amount of about 50 to about 90% by weight of the nougat. The proportion of each are quite variable being greatly dependent upon, inter alia, the distribution of the nougat composition between the frappe, bob syrup and the finished composition. Conventionally, the final nougat composition is prepared by the addition of the bob syrup to the frappe under agitation, and mixed until homogenous at temperatures between 65° C. and 120° C., with the addition of further ingredients such as flavorings, fats and oils, colorants, additional sweetener and the like, also under agitation. In the practice of the present invention, components which are not adversely affected by the heating of the bob syrup may be added to and heated with the bob syrup prior to addition of the frappe component.

An alternate method for the preparation of a pliable confection of the present invention does not require the formation of a whipped, frappe component. This method is preferred where a firm texture is desired. For example, with the use of gelatin alone it is preferred to dissolve the gelatin in a sufficient amount of water and then add the solution to the cooked bob syrup without the prior traditional aeration step. After mixing of the components, prior to setting, the composition may also be treated by a pulling step for a brief period of up to 2 minutes. The additional step is preferred for those processes in which the frappe is not rapidly agitated prior to mixing with the syrup.

A prefered embodiment of the present invention does not use any fat or oil thus providing a fat free nougat-like component. The nougat-like component of the present invention can however contain fats and oils in amounts up to about 7% by weight of the component. Suitable fats and oils include fractionated fat and hydrogenated, partially hydrogenated and unsaturated oils, such as coconut, palm, palm kernel, cotton seed, safflower, sun-flower, soy and corn oils and mixtures thereof. The term "fats" and "oils" are used interchangeably, although there may be differences as understood by the skilled artisan. "Fats" is generally a term to refer to the solid embodiment of the above-mentioned groups and "oils" refers to the liquid form.

Colorants which may be used in the present invention include pigments such as titanium dioxide that are incorporated into the nougat candy base and may be incorporated therein in amounts of up to 1% by weight. Also, the colorants may include other dyes suitable for food, drug and cosmetic applications, and known as F.D.&C. dyes and lakes. The materials acceptable for the foregoing uses are preferably water-soluble. A full recitation of all F.D.& C. colorants and their corresponding chemical structures may be found in the Kirk-Othmer Encyclopedia of Chemical Technology, 3rd Edition, in volume 5 at pages 857–884.

A graining compound may be employed in the nougat to promote faster setting times for the final product. The graining compound is selected from the group consisting of icing sugar or fondant, sucrose, sorbitol, mannitol, xylitol, galactitol, maltitol, lactitol, isomalt, lactose, commercial instant fondant powder and mixtures thereof. Preferably fondant is used. The graining compound when used is present in an amount from about 0.5% to about 5.0% by weight of the nougat.

Flavorings may be added into the confection. The flavorings (flavoring agents) that may be used include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combination thereof. Non-limiting representative flavor agents include (A) flavor oils such as spearmint, cinnamon, oil of wintergreen (methyl salicylate), peppermint (menthol), clove, bay, anise, eucalyptus, thyme, cedar leaf, oil of nutmeg, allspice, oil of sage, mace, oil of bitter almonds, and cassia oil; (B) artificial, natural and synthetic fruit flavors such as vanilla; citrus oils including lemon, orange, lime, grapefruit; and fruit essences including apple, pear, peach, grape, strawberry, raspberry, cherry, plum, pineapple, apricot and so forth; (C) aldehydes and esters such as acetaldehyde, benzaldehyde, anisic aldehyde, cinnamic aldehyde, citral, neral, decanal, ethyl vanillin, heliotrope, piperonal, vanillin, alpha-amyl cinnamaldehyde, butyraldehyde, valeraldehyde, citronellal, decanal, dihydrocarvyl acetate, eugenyl formate, aldehyde C-8, aldehyde C-9, aldehyde C-12, 2-ethyl butyraldehyde, hexenal, tolyl aldehyde, veratraldehyde, 2,6-dimethyl-5-heptenal, 2,6-dimethyloctanal, 2-dodecenal, p-methylanisol, and so forth. Generally any flavoring or food additive such as those described in Chemicals Used in Food Processing, publication 1274, pages 63–258, by the National Academy of Sciences, may be used.

Commonly used flavors include the mints such as spearmint and peppermint (menthol), vanilla and artificial vanilla, cinnamon derivatives, chocolate and artificial chocolate, carob, powdered honey, powdered cocoa, chocolate liquor and various fruit flavors, whether employed individually or in admixture.

The amount of flavoring employed is normally a matter of preference subject to such factors as flavor type, individual flavor, nougat base and strength desires. Thus, the amount may be varied in order to obtain the result desired in the final product. Such variations are within the capabilities of those skilled in the art without the need for undue experimentation. In general, amounts of about 0.1% to about 5.0% by weight of the nougat candy are useable.

The nougat, may also contain effective amounts of acidulants such as malic acid, citric acid, tartaric acid, adipic acid, and mixtures thereof. Bulking agents such as polydextrose, maltodextrin, cellulose and the like, may also be used in the nougat.

The present invention also comprises a chewing gum component. The chewing gum component may be a conventional chewing gum or bubblegum, sugar or sugarless, with a sugared bubblegum being the preferred gum component.

Chewing gum is traditionally considered as being comprised of a water insoluble or base portion and a water soluble portion which contains flavors, sweeteners and colorants. The gum base part of the gum is a masticatory substance which imparts the chew characteristics to the final product. It defines the release profile of flavors and the sweeteners and plays a significant role in the gum product. The flavors, sweeteners and colors can be thought of as providing the sensory appeal aspects of the chewing gum.

The chewing gum according to the present invention may be made from any gum base composition well known in the art and includes those gum bases utilized for conventional chewing gums and bubblegums. Gum bases typically include a polymeric material and may comprise elastomers, resins, polyvinyl acetates, waxes, fats, oils, emulsifiers, fillers and antioxidants.

Elastomers provide the chew, springiness or bounce to the base and control bubble and flavor release in the final chewing gum. They may be any water-insoluble polymer known in the art. They include styrene butadiene copolymers (SBR) and non-SBR types, both natural and synthetic. Examples of natural elastomers include, without limitation, rubbers such as rubber latex (natural rubber) and guayule, and gums such as chicle, jelutong, balata, guttapercha, lechi capsi, sorva, crown gum, nispero, rosidinha, perillo, niger gutta, tunu, gutta kay, pendare, leche de vaca, chiquibul, crown gum, and the like, and mixtures thereof. Examples of synthetic elastomers include, without limitation, polyisobutylene, isobutylene-isoprene copolymers (butyl rubber), polyethylene, polybutadiene, styrene-butadiene copolymers, polyisoprene and the like, and mixtures thereof.

The amounts of elastomer (rubbers) employed in the gum base composition will vary greatly depending upon various factors such as the type of gum base used (abhesive or conventional, bubble or standard) the consistency of the gum base composition desired, and the other components used in the composition to make the final chewing gum product. In general, the elastomer is present in the gum base composition in an amount of from about 15% to about 60%, preferably from about 25% to about 30%, by weight based on the total weight of the gum base composition.

Elastomer solvents aid in softening or plasticizing the elastomer component. In doing so they provide a bulkiness to the chew.

Elastomer solvents include but are not limited to natural rosin esters and synthetic derivatives of, e.g., terpenes. Examples of elastomer solvents suitable for use herein include tall oil rosin ester; partially hydrogenated wood and gum rosin; the glycerol esters of wood and gum rosin, partially hydrogenated wood/gum rosin, partially dimerized wood and gum rosin, polymerized wood and gum rosin, and tall oil rosin; the deodorized glycerol ester of wood rosin; the pentaerythritol esters of wood and gum rosin; partially hydrogenated wood and gum rosin; the methyl ester of partially hydrogenated wood rosin; methyl, glycerol and pentaerythritol esters of rosins and modified rosins such as hydrogenated, dimerized and polymerized rosins; terpene resins such as polymers of alpha-pinene or beta-pinene, terpene hydrocarbon resins; polyterpenes; and the like, and mixtures thereof. The elastomer solvent may be employed in the gum base composition in an amount of from about 2% to about 40%, and preferably from about 7% to about 15%, by weight of the gum base composition.

Polyvinyl acetates provide stretch or elasticity to the gum base. They also affect chew bulkiness, softness and bubble, hydrophilic character and flavor release.

The amounts of the different molecular weight polyvinyl acetates present in the gum base composition should be effective to provide the finished chewing gum with the desired chew properties, such as integrity, softness, chew bulkiness, film-forming characteristic, hydrophilic character, and flavor release. The total amount of polyvinyl acetate used in the gum base composition is usually from about 45% to about 92% by weight based on the total gum base composition. The vinyl polymers may possess a molecular weight ranging from about 2000 up to about 95,000.

Typically, the low molecular weight polyvinyl acetate has a weight average molecular weight of from about 2,000 to about 14,000. The medium molecular weight polyvinyl acetate typically has a weight average molecular weight of from about 15,000 to 55,000. The high molecular weight polyvinyl acetate typically has a weight average molecular weight of from 55,000 to about 95,000 but may range as high as 500,000.

Waxes, fats/oils plasticize the elastomer mixture and improve the elasticity of the gum base. Waxes can provide a soft or firm chew, affect the flavor release and provide bulkiness and smoothness to the gum base. Fats and oils provide a soft chew. The fats, oils and waxes may be use individually or in combination or the gum base may be a wax free gum base.

Waxes when used, may be of mineral, animal vegetable or synthetic origin. Non-limiting examples of mineral waxes include petroleum waxes such as paraffin and microcrystalline waxes, animal waxes include beeswax, vegetable waxes include carnauba, candellila, rice bran, esparto, flax and sugarcane, and synthetic waxes include those produced by the Fischer-Tropsch synthesis, and mixtures thereof.

Suitable oils and fats usable in gum compositions include hydrogenated or partially hydrogenated vegetable or animal fats, such as cottonseed oil, soybean oil, coconut oil, palm kernel oil, beef tallow, hydrogenated tallow, lard, cocoa butter, lanolin and the like; fatty acids such as palmitic, oleic, stearic, linoleic, lauric, myristic, caproic, caprylic, decanoic or esters and salts as sodium stearate and potassium stearate.

These ingredients when used are generally present in amounts up to about 7%, and preferably up to about 3.5%, by weight of the gum composition.

Preferred as softeners are the hydrogenated vegetable oils and include soybean oil and cottonseed oil which may be employed alone or in combination. These softeners provide the gum base composition with good texture and soft chew characteristics. These softeners are generally employed in an amount from about 5% to about 14% by weight of the gum base composition.

Emulsifiers aid in dispersing the immiscible components of the gum base composition into a single stable system. They provide hydrophilic character to a gum base and aid in plasticizing the resins and polyvinyl acetates. They also affect the softness of the base and the bubble character of the base. Typical emulsifiers include acetylated monoglyceride, glyceryl monostearate, lecithin, fatty acid monoglycerides, diglycerides, propylene glycol monostearate, lecithin, triacetin, glyceryl triacetate and the like, and mixtures thereof. Preferred emulsifiers are glyceryl monostearate and acetylated monogylcerides. These serve as plasticizing agents. The emulsifier may be employed in an amount of from about 2% to about 15%, and preferably from about 7% to about 11%, by weight of the gum base composition.

The fats, oils, waxes, emulsifiers and certain sugar bulking agents are often grouped together and referred to as softeners. Because of the low molecular weight of these ingredients, the softeners are able to penetrate the fundamental structure of the gum base making it plastic and less viscous. Useful plasticizers and softeners of the above include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerin, fully unsaturated vegetable oils such as non-hydrogenated cotton seed oil, hydrogenated vegetable oils, petroleum waxes, sorbitan monostearate, tallow, and the like, and mixtures thereof and also include high fructose corn syrup, corn syrup, sorbitol solution, hydrogenated starch hydrolysate, and the like, and mixtures thereof.

A preferred softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The amount of softener present should be an effective amount to provide a finished chewing gum with the desired chew bulkiness and softness. When used as softeners these materials are generally employed in the gum base composition in an amount of up to about 25%, and preferably in an amount of from about 1% to about 17%, by weight of the gum base composition.

The gum base may further contain a surfactant. Examples of suitable surfactants include polyoxyethylene (20) sorbitan monooleate, polyoxyethylene (20) sorbitan monolaurate, polyethylene (4) sorbitan monolaurate, polyoxyethylene (20) sorbitan monopalmitate, polyoxyethylene (20) sorbitan monostearate, polyoxyethylene (4) sorbitan monostearate, polyoxyethylene (20) sorbitan tristearate, polyoxyethylene (5) sorbitan monooleate, polyoxyethylene (20) sorbitan trioleate, sorbitan monolaurate, and the like. The amount of surfactant present should be effective to provide the finished chewing gum with the desired softness. Typically, the surfactant is employed in the base in an amount of from about 0.5% to about 3.0% by weight based on the total weight of the gum base.

The gum base composition of this invention may also include effective amounts of fillers sometimes referred to as bulking agents. These materials add firmness and bulk and affect the texture and the flavor release of the chewing gum. Useful fillers include organic and inorganic compounds (mineral adjuvants) such as calcium carbonate, magnesium carbonate, ground limestone, magnesium silicate, calcium phosphate, cellulose polymers, clay,alumina, aluminum hydroxide, aluminum silicate, talc, tricalcium phosphate, dicalcium phosphate, and the like, and mixtures thereof. These fillers or adjuvants may be used in the gum base compositions in various amounts. The amount of the filler present should be effective to provide a finished chewing gum with the desired flavor release and integrity. Typically, the filler is employed in the gum base composition in an amount from about 1% to about 40%, and preferably from about 5% to about 20%, by weight of the gum base composition.

The gum base may also comprise an antioxidant to provide improved stability, lessen any off-taste and provide longer shelf life. Typical non-limiting examples of antioxidants are butylated hydroxytoluene (BHT), butylated hydroxyanisole (BHA), propyl gallate. Mixtures thereof may also be used.

Other conventional chewing gum additives known to one having ordinary skill in the chewing gum art may also be used in the gum base composition of the present invention.

The manner in which the gum base components are admixed is not critical and is performed using standard techniques and apparatus known to those skilled in the art and may be a traditional batch-type process or any extrusion-type process. In a typical method, an elastomer is admixed with an elastomer solvent and/or a plasticizer and/or an emulsifier and agitated for a period of time usually from 1 to 30 minutes. After blending is complete, the polyvinyl acetate components are then added to the mixture. It is preferred that the high molecular weight polyvinyl acetate is added and blended first followed by the medium and then the low molecular weight polyvinyl acetates. In this manner, uniform blending can be achieved without the creation of isolated pockets of polyvinyl acetate in the elastomer. The filler is then blended into the polyvinyl acetate. The remaining ingredients may then be added in bulk, incrementally, or stepwise while mixing until a homogeneous mass is obtained. The process may take from 30 minutes to 4 hours in a traditional batch type process. The final mass temperature may vary from 60° C. to 150° C. The final homogeneous mass is discharged from the mixer and allowed to cool and thereafter the gum base composition is incorporated into a chewing gum composition.

The amount of gum base employed in the chewing gum composition will vary depending on such factors as the type of product desired, the type of gum base used, the consistency desired, and the other components used to make the final chewing gum product. In general, base can be included in the final chewing gum product in amounts from 5–75% by weight of the product. For the present application it is preferred to use base in amounts of from 20%–60%, and most preferably 30–50% by weight.

Once prepared, the gum base may be formulated to prepare a wide variety of chewing gum compositions.

The chewing gum composition according to the present invention may contain an effective amount of at least one sweetener. The sweetener may comprise sugars, sugar alcohols, which can also function as bulking agents, or intense sweeteners, or mixtures thereof.

Chewing gum compositions generally include bulking/ binding agents (carriers, extenders) which may be water-soluble, in addition to those fillers described in the manufacture of the gum base. The sugar and sugar alcohol sweeteners, which have a range in sweetening intensity, also function as the bulking agents. For example, in sugarless gum compositions, a sweetening agent, such as sorbitol or other sugar alcohol, may also function as a bulking agent.

Suitable sugars include those provided for use in the nougat-like confection as described above, namely, monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. When the chewing gum composition is a sugar gum, mixtures of sucrose and corn syrup solids are the preferred sugar bulking agents.

Suitable sugar alcohol bulking agents include sorbitol, xylitol, mannitol, galactitol, maltitol, isomalt (a racemic mixture of alpha-D-glucopyranosyl-1,6-mannitol and alpha- D-glucopyranosyl-1,6-sorbitol manufactured under the tradename PALATINIT® by Suddeutsche Zucker), and mixtures thereof. Mixtures of sorbitol and mannitol are the preferred sugar alcohol bulking agents. Other bulking agents are the maltodextrins; hydrogenated starch hydrolysates; hydrogenated hexoses; hydrogenated disaccharides; and the like, and mixtures thereof.

Bulking agents or sweeteners described above, may be used in an amount of from about 17% to about 90% and preferably in an amount of from about 25% to about 65%, by weight based on the total weight of the gum base composition.

The chewing gum compositions may also include a high intensity sweetening agent (sweeteners). High intensity sweetening agents have a sweetness intensity substantially greater than that of sucrose.

Examples of suitable intense sweeteners include (A) water-soluble naturally-occurring intense sweeteners such as dihydrochalcones, monellin, steviosides, glycyrrhizin, dihydroflavenol, and L-aminodicarboxylic acid aminoalkenoic acid ester amides, such as those disclosed in U.S. Pat. No. 4,619,834, and mixtures thereof; (B) water-soluble artificial sweeteners including the soluble saccharin salts such as sodium or calcium saccharin salts, cyclamate salts, the sodium, ammonium or calcium salts of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfam-K), the free acid form of saccharin, and the like, and mixtures thereof; (C) dipeptide based sweeteners including L-aspartic acid derived sweeteners, such as 1-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenyl-glycerine and L-aspartyl-L-2,5-dihydrophenyl-glycine, L-aspartyl-2,5-dihydro-L-phenylalanine, L-aspartyl-L-(1-cyclohexene)-alanine, and the like, and mixtures thereof; (D) water-soluble intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose®; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof; and (E) protein based intense sweeteners such as thaumaoccous danielli (Thaumatin I and II). The amount of sweetener employed in the chewing gum composition will vary with the sweetener selected for a particular chewing gum. Thus, for any given sweetener a sufficient amount of sweetener is used to provide the level of sweetness desired. The saccharide sweeteners and sugar alcohols described above are usually used in an amount of from about 1% to about 70% and preferably in an amount of from about 40% to about 50%, by weight based on the total weight of the chewing gum composition. The intense sweeteners described above are usually used in an amount of up to about 1%, preferably from about 0.05% to about 0.4%, by weight based on the total weight of the chewing gum composition.

The chewing gum composition may also contain a flavor agent selected from those flavors known to the skilled artisan, and include natural and artificial flavors. These flavorings may be chosen from the group provided for incorporation into the nougat-like component described above and may include synthetic flavor oils and flavoring aromatics and/or oils, oleoresins and extracts derived from plants, leaves, flowers, fruits, and so forth, and combinations thereof. These flavoring agents may be used in liquid or solid form and may be used individually or in admixture. Other ingredients which may be used in the flavoring component include acids such as citric, tartaric, malic and the like acidulants.

The flavoring agent may be employed in either liquid form and/or dried form, including free forms, such as spray dried, powdered, and beaded forms, and encapsulated forms, and mixtures thereof. Alternatively, the flavoring agent may be spray dried onto oil or the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5% by weight of the chewing gum composition.

The coloring agents are used in amounts effective to produce the desired color. These coloring agents may be selected from the group of coloring agents provided above for incorporation into the nougat-like component and include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications.

Other conventional additives may be used in chewing gum compositions. Examples of other conventional additives which may be used include thickening agents such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the other ingredients of the final desired chewing gum composition. For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation. The remaining ingredients of the gum composition such as the bulking agent, and/or fillers, coloring agents, high intensity sweeteners and flavoring agents are then added and mixed until a homogeneous mass is produced. The homogeneous mass is then formed into the desired shapes. The chewing gum may also be produced by a continuous process such as that described in U.S. Pat. No. 5,045,325.

The invention also provides a method for the manufacture of the chewable confectionery composition of the invention. The confection can be prepared by any conventional manufacturing process that may be used to concentrically form the product having a pliable outer shell and the inner chewing gum core. In one embodiment, a double feed extruder having two concentrically aligned delivery tubes, i.e., an inner and an outer tube, may be used. Such coextruders are supplied by Bepex Hutt, Werner Pfeiderer, LeHara, APV Baker, Togum, Bosch. The core chewing gum material may be fed through the inner delivery tube of the extruder and the shell material may be fed through the outer delivery tube.

Another embodiment uses a batch roller system such as Carle Montanari, Bosch and the like. This system generally contains an inner extrusion tube surrounded by longitudinally placed rollers. The pliable confection is fed to the outer surface area of the inner tube where it is drawn and thinned by the rollers around the tube. The chewing gum is extruded through the center tube. The processing forms a rope comprised of the confectionery shell and inner extruded gum core at the exit nozzle of the inner tube. The rope is cooled, sized, cut into the desired shape prior to packaging.

While the present invention has been described with respect to what is presently considered to be the preferred embodiments, it is to be understood that the invention is not limited to the disclosed embodiments. The present invention is intended to cover various modifications and equivalent mechanisms included within the spirit and scope of the appended claims.

EXAMPLES

The following examples provide chewable confectionery compositions prepared in accordance with the teachings of the present invention.

Examples 1–2

These examples illustrate chewable confectionery compositions of the invention having a fat-free nougat as the outer shell. Example 1 is a coextruded composition having a pineapple flavored shell (A) with an orange flavored bubblegum core (B). Example 2 is a coextruded composition having a fruit flavored shell (C) and fruit flavored bubblegum core (D).

| a. Nougat Shell[1] | | |
| --- | --- | --- |
| | A | B |
| Frappe | | |
| Gelatin | 5.2 | 5.2 |
| Gum Arabic | 1.7 | 1.7 |
| Dextrin | 2.5 | 2.5 |
| Water | 31.2 | 31.2 |
| Corn syrup | 59.4 | 59.4 |
| | 100.0 | 100.0 |
| Bob Syrup | | |
| Sugar | 73.1 | 73.1 |
| Corn Syrup | 19.9 | 19.1 |
| Water | 7.0 | 7.0 |
| | 100.0 | 100.0 |
| Batch | | |
| Frappe | 14.9 | 14.9 |
| Bob Syrup | 70.7 | 70.7 |
| Pineapple Flavor | — | .4 |
| Fruit Flavor | .2 | — |
| Acidulants/Color | 1.0 | 1.6 |
| Confectionery Sugar | 1.0 | 1.0 |
| Water | 12.2 | 11.4 |
| | 100.0 | 100.0 |

[1]Percent By Weight

The frappe was prepared by dissolving the gelatin in the water. The gum arabic and dextrin were added and the mixture was stirred in a Hobart mixer. The corn syrup was added and the mixture was whipped to a density of about 0.5 g/ml. The bob syrup was prepared by combining and heating the components in a candy cooker up to a temperature of 120° C. The bob syrup, frappe and additional ingredients were combined in a Hobart mixer with stirring. The batch was cooled then held for coextrusion with the gum base.

| b. Bubblegum Core[1] | | |
| --- | --- | --- |
| | C | D |
| Bubblegum Base | 35.0 | 38.0 |
| Corn syrup | 8.0 | 8.0 |
| Sugar, pulverized | 55.6 | 50.0 |
| Glycerin | — | 0.3 |
| Fruit Flavor | 1.4 | — |
| Orange Cream Flavor | — | 2.0 |
| Acidulant/Color | <0.1 | 1.7 |
| | 100.0 | 100.0 |

[1]Percent By Weight

The bubble gum compositions were prepared according to the embodiments of the present invention by a batch process using kettles. The prepared gum was held on slabs prior to co-forming the chewable confectionery product with the nougat-like shell.

c. Chewable Confectionery Compositions: 1–2

The nougat (A) was combined with the gum (C) to prepare the Example 1 confection. The nougat (B) was combined with the gum (D) to form the Example 2 confection. The following procedure was followed for both. The pliable confection was fed to a hopper for feeding the outer tube of a Bepex Hutt coextruder. The chewing gum core material was fed to a hopper for feeding the inner tube of the coextruder. The gum mass and nougat were coextruded in an approximate 50/50 ratio by weight using a rectangular center-filled nozzle into a rectangular continuous rope. The rope was sized, cut and wrapped.

The two chewable confections were evaluated for their texture and liking of the dual candy/gum product. Both were evaluated as having a firm texture on initial chew. Both were evaluated as having the texture of a chewy candy that turned into a good bubblegum upon chewing. A panel of consumers favorably evaluated the products having a strong liking for the effect upon chewing.

Examples 3–6

These examples illustrate chewable confections of the invention having a low-fat nougat-like confection as the outer shell. Example 3 is a composition having a strawberry flavored shell (E) with a banana flavored bubblegum core (I). Example 4 is a composition having a pineapple flavored shell (F) with an orange flavored bubblegum core (J). Example 5 is a composition having a cherry flavored shell (G) with a grape flavored bubblegum core (K). Example 6 is a composition having a yogurt flavored shell (H) with a grape flavored bubblegum core (L).

| a. Nougat Shell - General Formula[1] | |
|---|---|
| Frappe | |
| Gelatin | 26.7 |
| Gum Arabic | 6.7 |
| Water | 66.6 |
| | 100.0 |
| Bob Syrup | |
| Sugar | 62.5 |
| Corn Syrup (80%) | 37.5 |
| | 100.0 |
| Batch | |
| Frappe | 1.3 |
| Bob Syrup | 86.8 |
| Fat | 5.1 |
| Lecithin | 1.0 |
| Flavor/Acidulants | 0.8 |
| Dextrin | 1.0 |
| Pulverized Sugar | 4.0 |
| | 100.0 |

[1]Percent By Weight

The general formula was used to prepare four flavored pliable confectionery compositions. An adjustment was made in the amount of bob syrup to accommodate the amount of flavor/acidulant/colorant needed to produce the particular flavor. The flavor prepared and the corresponding amounts of bob syrup are as follows:

| Flavor | Percent Bob Syrup |
|---|---|
| (E) Strawberry | 86.2 |
| (F) Pineapple | 85.7 |
| (G) Cherry | 86.1 |
| (H) Yogurt | 86.8 |

The confections were prepared in a manner similar to that used in Examples 1–2. The batch was cooled then held for coextrusion with the gum base.

| b. Bubblegum Core[1] | | | | |
|---|---|---|---|---|
| | I<br>Banana | J<br>orange | K<br>Grape-1 | L<br>Grape-2 |
| Bubblegum Base | 38.0 | 38.0 | 38.0 | 38.0 |
| Corn syrup | 8.0 | 8.0 | 6.0 | 6.0 |
| Sugar, pulverized | 51.7 | 50.0 | 52.2 | 52.2 |
| Glycerin | 0.3 | 0.3 | — | — |
| Flavor/Acidulant/Color | 2.1 | 3.7 | 3.8 | 3.8 |
| | 100.0 | 100.0 | 100.0 | 100.0 |

[1]Percent By Weight

The bubble gum compositions were prepared in a manner similar to that used in Examples 1–2. The prepared gum was held on slabs prior to co-forming the chewable confectionery product with the pliable confection.

c. Chewable Confectionery Compositions: 3–6

The above components were combined to prepare the four chewable confections Examples 3–6 above, by coextruding the nougat shell and the chewing gum core in a manner similar to that described for Examples 1–2.

The four confections were evaluated for their texture and liking of a dual candy/gum product. All were evaluated as having the texture of a chewy candy that turned into a bubblegum upon chewing. The flavors were perceived as strong throughout the chew. A panel of consumers favorbly evaluated the products having a strong liking for the effect of changing from a candy to a gum upon chewing. The confection was described having a texture similar to chewy nougat brand of candy.

Examples 7

This example illustrates the formation of a chewable confection of the invention prepared without frappe formation. The gelatin was dissolved in water and added to the bob mixture. Neither the gelatin nor the bob were whipped in the formation of the nougat. An extra pulling step was applied to the candy mass prior to cooling.

| a. Nougat Shell[1] | |
|---|---|
| Bob Syrup | |
| Sugar | 36.5 |
| Corn Syrup | 40.5 |
| Water | 13.3 |
| Starch | 4.3 |
| Hydrogenated fat | 4.9 |
| Emulsifier | 0.4 |
| Color | 0.1 |
| | 100.0 |
| Batch | |
| Gelatin (1:2 in water) | 0.8 |
| Bob Syrup | 92.6 |
| Pineapple Flavor | 0.3 |
| Acidulants | 1.3 |
| Confectionery Sugar | 5.0 |
| | 100.0 |

[1]Percent By Weight

The bob syrup was prepared by combining and heating the components in a candy cooker up to a temperature of 120° C. The gelatin was dissolved in water and combined with the bob syrup with stirring. The batch was cooled then held for combining with the gum base.

| b. Bubblegum Core[1] | |
| --- | --- |
| Bubblegum Base | 46.0 |
| Glucose | 7.2 |
| Sugar, pulverized | 44.1 |
| Orange Cream Flavor | 1.2 |
| Acidulant/Color | 1.5 |
| | 100.0 |

[1]Percent By Weight

The bubble gum compositions were prepared according to the embodiments of the present invention by a batch process using kettles. The prepared gum was held on slabs prior to co-forming the chewable confectionery product with the nougat shell.

c. Chewable Confectionery Composition: 7

The pineapple flavored pliable confection was combined with the orange cream flavored to prepare the chewable confection. A batch roller was used to prepare the chewable confection. The chewing gum was fed to the inner tube of a batch roller. The pliable confection was fed to the outer surface area of the inner tube of the batch roller for sizing the candy to form a shell over the extruded gum in an approximate 50/50 ratio by weight. The rope was further sized, cut and wrapped.

The chewable confection thus formed was evaluated by a test panel for texture and flavor perception. The texture was found to be fairly firm, nougat-like, and transitional to the soft chew of a bubblegum upon chewing. The product was found to provide a distinct flavor change on going from the outer firm nougat texture to the texture of a bubblegum.

We claim:

1. A chewable confectionery product having a core and an outer shell wherein said core and said outer shell have different chew textures, the core having a soft chew and the outer shell having a firm, short and crystalline feel, and wherein (a) said core comprises a chewing gum composition having a chewing gum base, sweetener, softener and flavorant; and (b) said outer shell comprises a grained nougat-like confection having a sweetener, a whipping agent and a fat content of 0 to 7 percent by weight of said composition.

2. The product according to claim 1 wherein the grained nougat-like confection sweetener is comprised of sucrose and corn syrup in a sucrose to corn syrup ratio of greater than 1/1 by weight of the composition.

3. The product according to claim 2 wherein the grained nougat-like confection has a sucrose to corn syrup ratio of 3/2 to 4/1 by weight.

4. The product according to claim 1 wherein the grained nougat-like confection has a fat content of 5.5% or less.

5. The product according to claim 4 wherein the grained nougat-like confection has a fat content of 0%.

6. The product according to claim 1 wherein the chewing gum composition has a base content of from 25 to 65% by weight of the gum.

7. The product according to claim 6 wherein the chewing gum composition has a base content of from 35 to 55% by weight of the gum.

8. The product according to claim 1 wherein the outer shell is from 30 to 70% by weight of the composition.

9. The product according to claim 8 wherein the outer shell is from 45 to 55% by weight of the composition.

10. The product according to claim 1 wherein the chewing gum is a bubble-gum.

11. The product according to claim 1 wherein the outer shell composition further comprises a flavorant.

12. The product according to claim 11 wherein the core composition and the outer shell composition comprise different flavorants.

13. The product according to claim 1 wherein the chewing gum base is comprised of an elastomer, elastomer solvent and softener.

* * * * *